(12) United States Patent
Bestfleisch et al.

(10) Patent No.: US 10,606,706 B2
(45) Date of Patent: Mar. 31, 2020

(54) GRAPHICAL USER INTERFACE WITH CONSISTENT REDUNDANT MODELS

(71) Applicant: SAP SE, Walldorf (DE)

(72) Inventors: Ulrich Bestfleisch, Schwetzingen (DE);
Oliver Klemenz, Sinsheim (DE);
Sergey Smirnov, Heidelberg (DE)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 15/356,144

(22) Filed: Nov. 18, 2016

(65) Prior Publication Data

US 2018/0144016 A1     May 24, 2018

(51) Int. Cl.

| | |
|---|---|
| G06F 17/30 | (2006.01) |
| G06Q 30/02 | (2012.01) |
| G06Q 50/00 | (2012.01) |
| G06F 11/14 | (2006.01) |
| G06F 11/30 | (2006.01) |
| G06F 9/451 | (2018.01) |

(52) U.S. Cl.
CPC .......... *G06F 11/1451* (2013.01); *G06F 9/452* (2018.02); *G06F 11/302* (2013.01); *G06F 11/3079* (2013.01); *G06F 2201/865* (2013.01)

(58) Field of Classification Search
CPC ............. G06F 17/30368; G06F 3/0484; G06F 17/30294; G06F 2201/86; G06F 11/1451; G06F 2201/805; G06F 17/30557; G06F 9/452
USPC ......................................................... 707/625
See application file for complete search history.

(56) References Cited

U.S. PATENT DOCUMENTS

| | | | | |
|---|---|---|---|---|
| 5,734,837 A | * | 3/1998 | Flores .............. | G06Q 10/06311 705/7.13 |
| 2003/0179230 A1 | * | 9/2003 | Seidman .............. | G06F 3/1454 715/750 |
| 2007/0162496 A1 | * | 7/2007 | Pulfer ..................... | G06Q 10/06 |
| 2009/0228253 A1 | * | 9/2009 | Tolone ................... | G06Q 10/10 703/6 |

OTHER PUBLICATIONS

Oracle® Database Advanced Replication 11g Release 2 (11.2) (Year: 2010).*
Atif M. Merron: An event-flow model of GUI-based applications for testing, Department of Computer Science, University of Maryland, College Park (Year: 2007).*

* cited by examiner

*Primary Examiner* — Kuen S Lu
(74) *Attorney, Agent, or Firm* — Mintz Levin Cohn Ferris Glovsky and Popeo, P.C.

(57) ABSTRACT

A computing device hosts a graphical user interface (GUI) of a computer application, the computer application being run on a backend computing platform accessible to the computing device via a network. The GUI includes multiple models in a Model-View-Controller (MVC) pattern, an eventing mechanism, and a model synchronizer. Each model in the GUI represents one or more application objects of the computer application. The eventing mechanism generates an application object change event when an application object of one of the multiple models in the GUI is changed to a new state. The model synchronizer listens to the generated application object change event, retrieves the new state of the application object, and locally updates other models of the multiple models in the GUI that also represent the application object with the new state of the application object.

20 Claims, 4 Drawing Sheets

FIG. 1

| Updating the changed application object instance, using a one round trip communication between the GUI and the backend to reload data corresponding to the changed or new state of the application object instance 305 |

| In response to a change to an application object instance in a model in the GUI, generating a new application object change event (which includes information identifying the changed application object instance, the "changed" model containing the changed application object, and the performed action type) 310 |

| Processing, by a model synchronizer in the GUI, the event to retrieve information, for example, on the new state of the changed application object instance, the type definition of the changed application object instance (i.e., the type definition of application object 3), and the "model," i.e., the model containing the changed application object instance 320 |

| Determining if there are any redundant models of the first type in the GUI corresponding to the changed model 330 |

| If there is such a redundant model of the first type, updating it by copying values of the changed application object instance attributes (reloaded from the backend) to the corresponding application object in redundant model 340 |

| Determining if there are any redundant models of the second type in the GUI corresponding to the changed model and updating such redundant models of the second type 350 |
| extracting (from the application object type definition of the changed application object instance) a set of application object types impacted by the performed action 352 |
| for each application object type in the set, determining which models contain an application object of the type impacted by the performed action to identify the redundant models of the second type 354 |
| Loading (from the backend) to the GUI the new state values for the (redundant model's) impacted application object attributes that are identified in the impact relationship attribute of the changed application object 356 |
| Locally copying the new values of the attributes that are loaded from the backend to the impacted application objects in the set of redundant models of the second type 358 |

GRAPHICAL USER INTERFACE WITH CONSISTENT REDUNDANT MODELS

BACKGROUND

In a typical server-client configuration for an enterprise application, backend infrastructure (i.e., servers and databases) is used to manage and store the data, logic, and rules of the application. A client computing device, which may be network connected to the backend infrastructure, runs a frontend graphical user interface (GUI) of the application. A user can interact with the application through the GUI using various input devices. Each piece of information (data) displayed in a view on the GUI is retrieved from the backend infrastructure in a roundtrip communication trip.

A graphical user interface (GUI) of a computer application is typically built in a Model-View-Controller (MVC) design pattern. In MVC, the GUI application is built from components (objects) of three types: models, views, and controllers. The model component represents the application logic—functions and data. The model component directly manages the data, logic, and rules of the application, independent of the user interface. The view component displays the modeled data to the user. The view component can be any output representation of information, such as a chart or a diagram. The controller component accepts user input on the GUI and converts it to commands for the model or view. From another perspective, the model is responsible for storing the information; view presents the information stored in model, while the controller modifies the model.

Distributed applications are applications or software that runs on multiple computers within a network at the same time and can be stored on servers or on cloud computing platforms. Unlike traditional applications that run on a single system, distributed applications run on multiple systems simultaneously for a single task or job.

A GUI for a distributed application in a cloud may maintain several models that describe a same object or fact (hereinafter "redundant models"). A change to a first of the redundant models without a corresponding change to a second of the redundant models may result in different information being stored in the models for the same object or fact.

Consideration is now being given to mechanisms for making the redundant models maintained by a GUI consistent (i.e. contain the same information for the same object or fact).

SUMMARY

A computing device includes a memory and a semiconductor-based processor. The memory and the processor are configured to host a graphical user interface (GUI) of a computer application that is run on a backend computing platform accessible to the computing device over a network.

In a general aspect, the GUI includes multiple models in a Model-View-Controller (MVC) pattern with each model representing one or more application objects of the computer application. The GUI further includes an eventing mechanism that generates an application object change event (change notification or message) when an application object of one of the multiple models in the GUI is changed to a new state, and a model synchronizer configured to listen to the generated application object change event.

In a further aspect, the model synchronizer retrieves the new state of the changed application object (e.g., from the backend) and updates other models of the multiple models in the GUI that also represent the application object with the new state of the application object. The model synchronizer updates the other models in the GUI using mostly local processes in the GUI with only limited communications with the backend (e.g., to retrieve the new states of the changed application objects from the backend).

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 3 is a schematic illustration of an example method for keeping the models of the GUI of FIG. 2 consistent after a change is made to a model in the GUI, in accordance with the principles of the present disclosure.

DETAILED DESCRIPTION

A GUI of a computer application may be constructed according to a Model-View-Controller (MVC) software architectural design pattern or framework. In this pattern, the model represents application data (e.g., application logic objects and data)$_{7i}$ the view displays the model data, and sends user actions (e.g. button clicks) to the controller, while the controller modifies the model or the view.

In some cases (e.g., in the case a distributed application), because of architectural considerations (e.g., design simplicity and performance optimization), a GUI of the application may include or maintain several models that contain information describing a same object or fact (hereinafter "common" object or fact). Such models may be referred to herein as "redundant" models.

A user may change the information describing the common object or fact in one of the redundant models maintained by the GUI. The redundant models maintained by the GUI should ideally be consistent or synchronized (i.e., each should contain the same information describing the common object or fact) so that the user can get a consistent value for the common object or fact regardless of which of the redundant models is accessed, for example, during a working session.

There are different approaches for making the redundant models consistent or synchronized. In one traditional approach, which minimizes communications with the backend, the GUI is assigned the responsibility for updating each of the redundant models for consistency after a change to one of the models. The GUI may be configured with capabilities for individually updating each of the redundant models for consistency (e.g., by propagating the change into each of the each of the redundant models). However, this approach can result in a complex GUI because of the additional capabilities that are included in the GUI for individually updating each of the redundant models. In another approach, the GUI relies on the backend to update each of the redundant models for consistency. Once a model is changed, the GUI may persist the changed model to the backend. After the backend updates all of the other redundant models for consistency, the GUI can reload the redundant models from the backend. This approach may keep the structure of the GUI simple, but can substantially increase the amount of communications needed between the GUI and the backend (needed for reloading the redundant models from the backend).

A solution for synchronizing redundant models in a frontend GUI involves use of a model synchronizer component disposed in the frontend GUI, in accordance with the principles of the present disclosure. The model synchronizer component may be configured to synchronize or update the redundant models of the frontend GUI for consistency using substantially local processes in the frontend GUI itself with minimal communications between the frontend and the backend.

For convenience in description of the model synchronizer component and its operation herein, the following definitions and terminology may be used.

Definitions and Terminology

Application object: An application object may represent a real world object (e.g., a document, a report, a purchase order, an invoice, etc.) within a software application. For example, consider a software application that enables users to edit and read documents or articles (e.g., news stories or journal articles) on line. The software application may also allow users to post comments on the articles and read posted comments (e.g., in a comment section). Within this example, "Article" and "Comment" are examples of application objects.

Application object type: Each application object may be of a defined type. In the foregoing example, Article and Comment are two application object types. Other example application object types may, for example, be document, report, purchase order, invoice, etc.

Application object attributes: Each application object may be described or modeled by a number of attributes. An application object may have a set of attributes based on the application object type. A mandatory attribute (e.g., ID) may uniquely identify an application object instance. The Article application object may, for example, have attributes: ID, author, creation time, text, and number of comments. The Comment application object may, for example, have attributes: ID, author, text, and article ID.

It will be noted that the attribute article ID of the Comment application object is a foreign key or reference for the ID of the Article application object. Furthermore, it will be noted that the foregoing attributes model the relation between Article application object and Comment application object in a redundant fashion: the Article application object attribute number of comments stores the number of comments related to the Article, while each Comment application object has an attribute article ID referencing the related Article. Because of the relationship between the Article application object and the Comment application object, when a comment to a referenced Article is created or deleted by a user, the referenced Article should be updated (i.e. the number of comments attribute should be updated) so that both objects contain consistent information.

Impact relationship attribute: If a change to an application object instance of one application object type requires an update of an application object instance of another application object type, we may say that the former application object "impacts" the latter application object. The application object type definition (e.g., Article or Comment) may include the impact relationship attribute. The impact relationship may be formally described by a quadruple: (an application object change operation, the impacted application object type, the name of an attribute of the changed application object that is a foreign key to the impacted application object, the set of the impacted application object attributes that require an update). An example impact relationship attribute value for the foregoing Comment application object may, for example, be: (Add or delete a comment, (Comment attribute=) ID, (Comment attribute=) article ID, and (Article attribute=) number of comments).

Model: A GUI may maintain or support several models representing application logic and data. A model may contain one or more application objects of different types. For example, a model for a GUI of the foregoing software application may include application objects of the type Article and the type Comment.

Redundant Models: In a first type of redundancy, any two models in the GUI are considered to be redundant models if each of the two models contains an application object of the same type and same ID. For example, if each of the two models contains the application object: Article (ID=1), the two models are considered to be redundant models. In a second type of redundancy, any two models in the GUI are considered to be redundant models if one of the models contains an application object that impacts another application object contained in the other model. For example, if one of the models contains the application object Comment, the type definition of which includes an impact relationship with the application object Article contained in the other model, the two models are considered to be redundant models.

Figure 1:
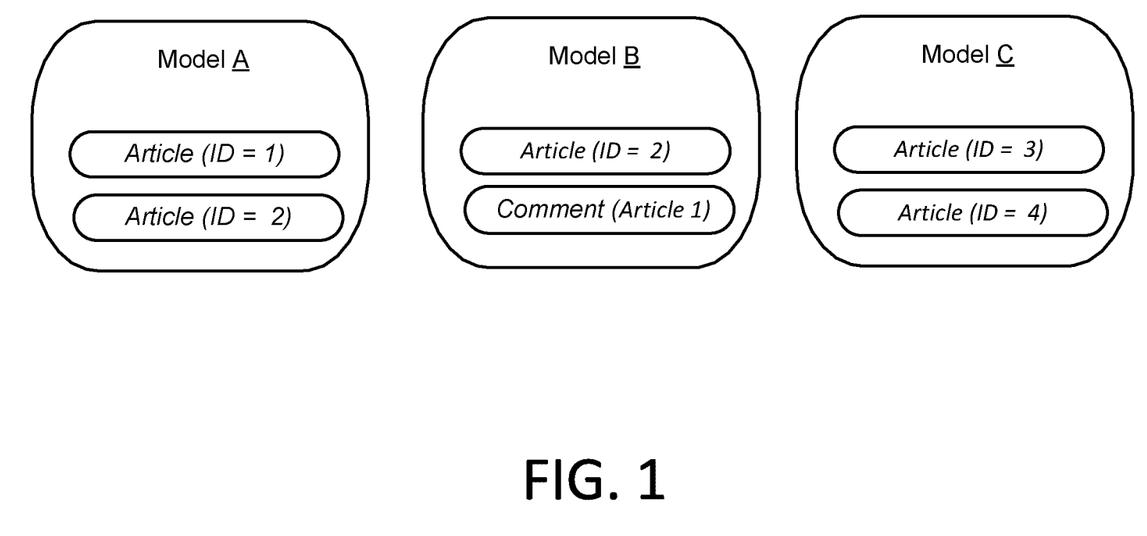
FIG. 1 is a schematic illustration of two different types of redundancy that may exist between example models.

FIG. 1 schematically illustrates the two different types of redundancy that may exist between example models (e.g., Models A, B and C) of a GUI. As shown in the figure, for example, Model A may contain two application objects—Article (ID=1) and Article (ID=2); Model B may contain two application objects—Article (ID=2) and Comment (Article ID=1); and Model C may contain two application objects—Article (ID=3) and Article (ID=4). In this example of FIG. 1, Model A and Model B are redundant models (of the first redundancy type) as they both contain an application object of the same type and same ID (i.e., application object Article (ID=2)). Further, Model A and Model C are not redundant models as they do not commonly contain an application object of the same type and same ID. Similarly, Model B and Model C are not redundant models as they do not commonly contain an application object of the same type and same ID.

Furthermore, as shown in FIG. 1, Model A and Model B are also redundant models (of the second redundancy type) because Model B contains the application object Comment (Article ID=1), whose type definition indicates an impact relationship with the application object Article (ID=1) contained in Model A.

Figure 2:
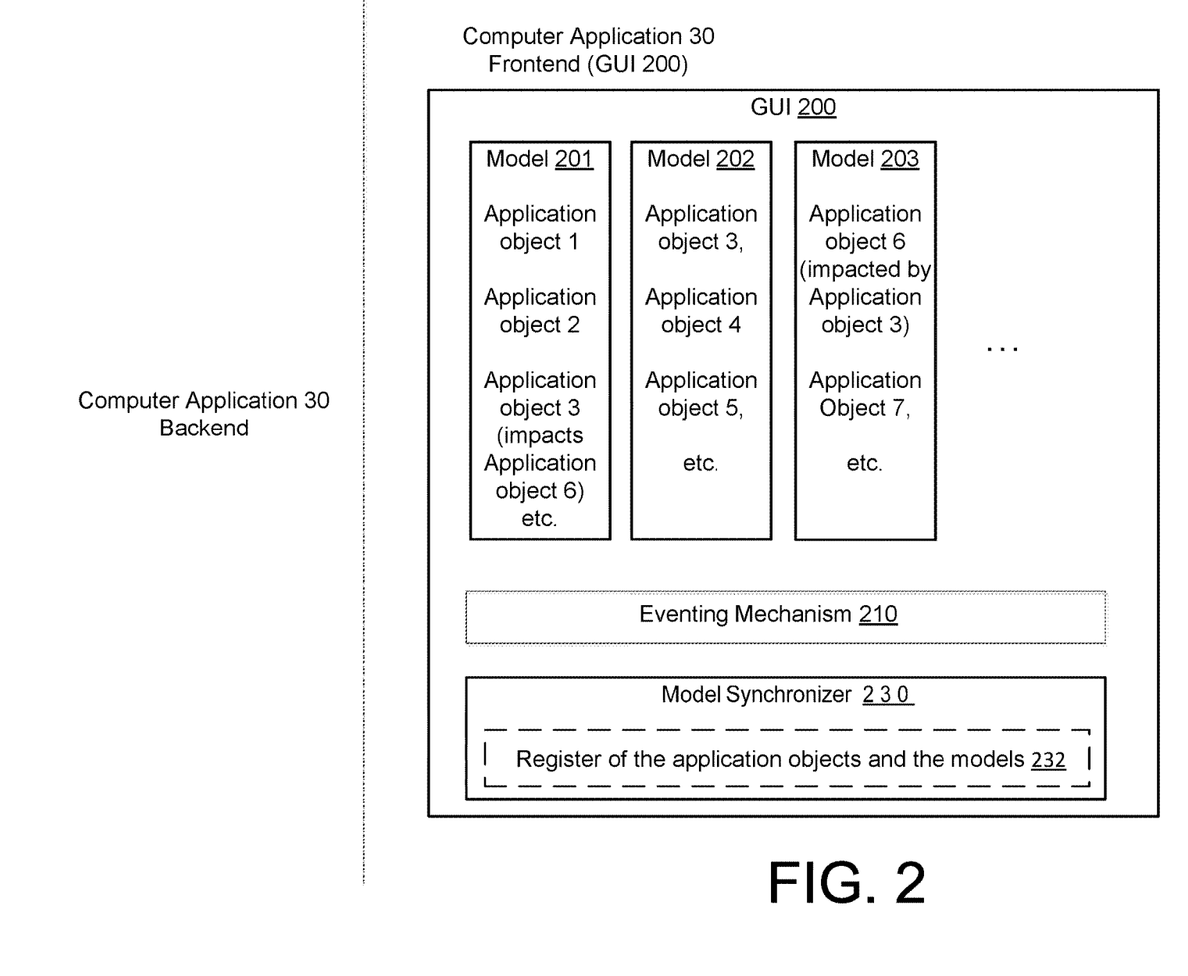
FIG. 2 is a schematic illustration of a graphical user interface (GUI) of a computer application, in accordance with the principles of the present disclosure.
Figure 4:
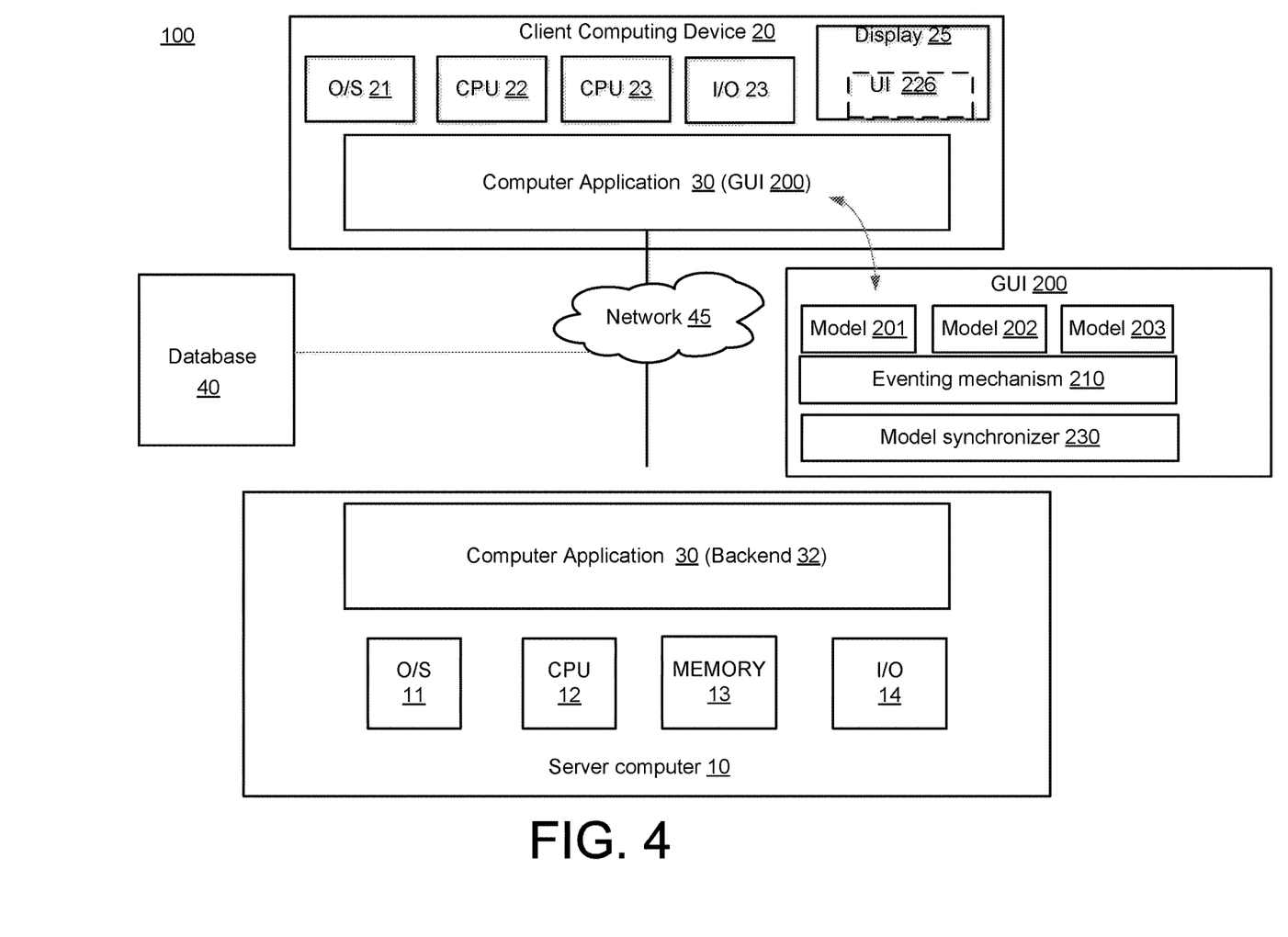
FIG. 4 is a schematic illustration of an example computer system, which incorporates a multi-model GUI for interacting with distributed applications or software, in accordance with the principles of the present disclosure. Like reference symbols in the various drawings indicate like elements.

FIG. 2 shows an example GUI 200 of a computer application 30, in accordance with the principles of the present disclosure. Computer application 30 may be hosted on backend servers (e.g., as shown in FIG. 4), while GUI 200 may be the application frontend hosted on a client computing device (e.g., as shown in FIG. 4). GUI 200, which may be constructed or coded using a MVC pattern, may include multiple models (e.g., models 201, model 202, model 203, etc.), view components and controller components that are associated with the models, an "eventing" mechanism 210 and a model synchronizer 230. For visual clarity, the view and controller components of GUI 200 associated with the models are not shown in the figure.

Each of the multiple models (e.g., model 201, model 202, model 203, etc.) in GUI 200 may include one or more application objects. For example, model 201 may include application object 1, application object 2, application object 3, etc.; model 202 may include application object 3, application object 4, application object 5, etc.; and model 203 may include application object 6 (impacted by application object 3), application object 7, etc. Each of the application objects may be of a respective application object type and have respective application object attributes. The application object type definition of one or more of these models may include an impact relationships attribute. The impact relationships attribute may, for example, identify an application object change operation type, the impacted application object type, the name of an attribute of the changed application object that is a foreign key to the impacted application object, and the set of the impacted attributes of the impacted application object.

One or more pairs of these models (e.g., model 201, model 202, model 203, etc.) in GUI 200 may be redundant models. A pair of the models may be redundant because they contain the same application object (e.g., models 201 and 202 may be redundant because they contain the same application object 3), or may be redundant because one of the models contains an application object that has an impact relationship with an application object contained in the other model (e.g., models 201 and 203 may be redundant because model 203 contains application object 6, which is impacted by application object 3 contained in model 201).

Eventing Mechanism 220

In GUI 200, eventing mechanism 220 may be configured to generate an event ("Application Object Change Event") whenever an application object is changed or modified (i.e., created, updated, or deleted). An Application Object Change Event may, for example, describe or reference the changed application object instance, the model containing the changed application object instance, and the performed action type (e.g., created, updated, or deleted). For example, if a user deletes application object 3 from model 202 in GUI 200, eventing mechanism 220 may, for example, generate an Application Object Change Event: (application object 3, model 202, deleted).

Model Synchronizer 230

In GUI 200, model synchronizer 230 may be an object configured to keep the models (e.g., models 201, model 202, model 203, etc.) of GUI 200 consistent after a change is made to an application object in a model, in accordance with the principles of the present disclosure.

In example implementations, when a new application object is created or added to GUI 200, the object registers itself with the model synchronizer 230. Model synchronizer may maintain a register (e.g., register 232) of the application objects and the models to which the application objects belong in GUI 200. As a result model synchronizer 230 includes information for determining sets of redundant models in GUI 200.

Model synchronizer 230 may be configured to listen to, and identify a changed model from, the Application Object Change Event generated by eventing mechanism 220. Model synchronizer 230 may be configured to identify the redundant models corresponding to the changed model (e.g., with reference to register 232) and to update these redundant models so that all models of GUI 200 carry consistent information.

FIG. 3 shows an example method 300, which may be implemented in GUI 200 using eventing mechanism 220 and model synchronizer 230, for keeping the models of GUI 200 (e.g., models 201, model 202, model 203, etc.) consistent after a change is made to any of the application objects or models of GUI 200, in accordance with the principles of the present disclosure.

For convenience in describing method 300, reference may be made hereinafter to an example scenario in which a controller specifically updates, for example, application object 3 of model 201 in GUI 200 shown in FIG. 2. Further, it may be assumed that in an initial state all the redundant models in GUI 200 are consistent.

Method 300 may begin, for example, when a controller (not shown) changes an application object instance (e.g., application object 3) in a model (e.g., model 201) in GUI 200 resulting in a new state of the application object in application 30. In response, method 300 may involve updating the changed application object instance (e.g., application object 3 in model 201) in the model by itself, using a one round trip communication between GUI 200 and the backend to reload data corresponding to the changed or new state of the application object instance (305).

In method 300, eventing mechanism 210 in GUI 200, in response to the changes made to a model (e.g., model 201) in GUI 200, may generate a new Application Object Change Event (which includes information identifying the changed application object instance (e.g., application object 3), the "changed" model (e.g., model 201) containing the changed application object, and the performed action type or type of change (e.g., "update")) (310). Further, model synchronizer 230 may listen to the Application Object Change Event generated by eventing mechanism 220, and process the event to retrieve information, for example, on the new state of the changed application object instance (i.e., the new state of application object 3), the type definition of the changed application object instance (i.e., the type definition of application object 3), and the "model," i.e., the model containing the changed application object instance (320).

Model synchronizer 230 (with which all application objects in GUI 200 are initially registered), may determine if there are any redundant models of the first type paired with the changed model (e.g., model 201) (330). If there is such a redundant model of the first type in GUI 200 (e.g., model 202), model synchronizer 230 may update it, for example, by copying values of the changed application object instance attributes (reloaded from the backend) to the corresponding application objects in redundant model (340).

Further, model synchronizer 230 may determine if there are any redundant models of the second type in GUI 200 (e.g., model 203) corresponding to the changed model (e.g., model 201), and update such redundant models of the second type (350). For this, model synchronizer 230 may extract (from the application object type definition/impact relationships attribute of the changed application object instance (e.g., application object 3 in model 201)) a set of application object types impacted by the performed action (352). Further, for each application object type in the set, model synchronizer 230 may determine which models in GUI 200 contain an application object of the type impacted by the performed action to identify the redundant models of the second type (354), and load (from the backend) to GUI 200 the new state values for the (redundant model's) impacted application object attributes that are identified in the impact relationship attribute of the changed application object (356). Model synchronizer 230 may further locally copy the new values of the attributes that are loaded from the backend to the impacted application objects in the set of redundant models of the second type (358).

By the foregoing actions, method 300 may ensure that redundant models (of the first type and of the second type) of a changed model in GUI 200 contain information which is consistent with the information contained in the changed model. It will be noted that method 300 may involve only two data transfers from the backend to GUI 200. One data transfer in method 300 may occur at 305 when the changed application object instance (e.g., application object 3 in model 201) is updated by itself, using a one round trip communication between GUI 200 and the backend to reload data corresponding to the changed or new state of the application object instance. A second data transfer in method 300 may occur at 356 when the new state values for the (redundant model's) impacted application object attributes may be loaded from the backend to GUI 200.

FIG. 4 is a schematic illustration of a computer system 100, which may incorporate a multi-model GUI (e.g., GUI 200) for interacting with distributed applications or software (e.g., application 30), in accordance with the principles of the present disclosure.

System 100 may include one or more server-side computing devices (e.g., server computer 10), one or more databases (e.g., database 40) and one or more client devices (e.g., client computing device 20). The different components of system 100 (e.g., server computer 10 and client computing device 20) may be connected to each other over a network 45. System 100 may host computer application 30, for example, in a client-server configuration. FIG. 4 shows, for example, a front end (e.g., GUI 200) of computer application 30 hosted on client computing device 20, and a backend 32 of computer application 30 hosted on server computer 10.

Computer 10, which includes an O/S 11, a CPU 12, a memory 13, and I/O 14 may further include or be coupled to a database 40. Database 40 may, for example, store data and information that is used or generated by computer application 30. While computer 10 is shown in the example of FIG. 4 as a single computer, it may be understood that computer 10 may represent two or more physical machines (and/or a virtual machines) in communication with one another, for example, in a distributed software or cloud environment. Client computing device 20 may be any computing device (e.g., a desktop computer, a mainframe computer, a server, a personal computer, a mobile computing device, a laptop, a tablet, or a smart phone) which may be available to a user to connect to computer 10 over network 45. Client device 20, like computer 10, may include components such an O/S 21, a CPU 22, a memory 23, an I/O 24, a display 25 including a UI 26, etc.

A user may access computer application 30 via GUI 200 hosted on client device 20. GUI 200 includes multiple models representing application information. Different models may represent a same application object. However, the user may expect that the different models are consistent so that the same information on the same application object is displayed by GUI 200 regardless of which of the different models is used to access to the same application object. Eventing mechanism 210 and model synchronizer 230 may ensure that the different models are synchronized and remain consistent after a change to, or action on, the application object in any one of the different models.

For an application object, which is changed directly by a controller, only one roundtrip communication is needed to retrieve the new or changed state of the application object from the backend. Model synchronizer 230 operates locally in GUI 200 to update all redundant models (of the first type) that contain the application object to the new state of the application object.

Similarly, for an "impacted" application object, which may be changed indirectly because of its relationship with the directly-changed application object, only one roundtrip communication is needed to retrieve the new state of the impacted application object from the backend. Model synchronizer 230 operates locally in GUI 200 to update all redundant models (of the second type) that contain the impacted application object to the new state.

With regard to the structure of GUI 200, implementation of the Application Object Change Event concept by eventing mechanism 210 allows decoupling of the causes of the model change from the consistency assuring actions of model synchronizer 230. Further, eventing mechanism 210 and model synchronizer 230 are transparent to the multiple models in GUI 200 so that the structure of GUI 200 can be simple.

The various systems and techniques described herein may be implemented in digital electronic circuitry, or in computer hardware, firmware, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computing device comprising:
   a memory; and
   a semiconductor-based processor, the memory and the processor hosting a graphical user interface (GUI) of a computer application, the computer application being hosted on a backend computing platform accessible to the computing device over a network,
   the GUI including:
   multiple models in a Model-View-Controller (MVC) pattern, each model representing one or more application objects of the computer application;
   an eventing mechanism configured to generate an application object change event when an application object of one of the multiple models in the GUI is changed to a new state; and
   a model synchronizer configured to listen to the generated application object change event, identify one or more redundant models in the multiple models and their corresponding types describing the application object, retrieve the new state of the changed application object, and locally update, based on the identified types, the one or more identified models in the GUI that also represent the application object with the new state of the application object.

2. The computing device of claim 1, wherein the a model synchronizer is further configured to identify an impacted application object that is impacted by the change to the application object, retrieve a new state of the impacted application object, and locally update a model in the GUI that represents the impacted application object with the new state of the impacted application object.

3. The computing device of claim 1, wherein the application object change event identifies the changed application object instance, the model containing the changed application object instance, and type of change.

4. The computing device of claim 1, wherein the model synchronizer maintains a register of the application objects and which models represent which the application objects in the GUI.

5. The computing device of claim 1, wherein each application object in the multiple models is of a defined type, wherein the application object type is characterized by a set of attributes including a mandatory ID attribute that uniquely identifies an application object instance in the GUI.

6. The computing device of claim 5, wherein the set of attributes for the application object in the GUI includes a foreign key or reference to the ID of a related application object, wherein the change to the application object impacts another application object and wherein the model synchronizer uses the a foreign key or reference to identify the impacted application object.

7. The computing device of claim 5, wherein a definition of the application object type includes an impact relationship attribute, the impact relationship attribute including identification of the change type, the impacted application object type, the name of an attribute of the application object that is a foreign key to the impacted application object, and a set of the impacted application object attributes that require an update when the application object is changed.

8. The computing device of claim 5, wherein the model synchronizer is configured to extract from the application object type definition of the changed application object, a set of application object types impacted by the change to the application object; and for each application object type in the set:
   determine which models in the GUI contain an application object of the type impacted by the change to the application object;
   load from the backend to the GUI the new state values for the impacted application object attributes that are identified in the impact relationship attribute of the changed application object; and
   locally copy the new values of the attributes that are loaded from the backend to the impacted application objects in models in the GUI.

9. The computing device of claim 1, wherein the eventing mechanism decouples a cause of the change to application object from the model synchronizer's model-updating processes in the GUI.

10. The computing device of claim 1, wherein the eventing mechanism and the model synchronizer processes are transparent to models in the GUI.

11. A method for providing access, via a network, from a frontend computing device to a computer application hosted on a backend computing platform, the method comprising:
   providing a graphical user interface (GUI) on the frontend computing device, the GUI including multiple models in a Model-View-Controller pattern, each of the multiple models containing one or more application objects of the computer application,
   using an eventing mechanism in the GUI to generate an application object change event when an application object of one of the multiple models in the GUI is changed to a new state; and
   using a model synchronizer in the GUI to listen to the generated application object change event, identify one or more redundant models in the multiple models and their corresponding types describing the application object, retrieve the new state of the changed application object, and locally update, based on the identified types, the one or more identified models in the GUI that also represent the application object with the new state of the application object.

12. The method of claim 11, wherein using the eventing mechanism in the GUI to generate an application object change event includes generating the application object change event that identifies the changed application object instance, the model containing the changed application object instance, and type of change.

13. The method of claim 11 further comprising:
maintaining, by the model synchronizer, a register of the application objects and which models represent which the application objects in the GUI.

14. The method of claim 11, wherein each application object in the multiple models is of a defined type, wherein the application object type is characterized by a set of attributes including a mandatory ID attribute that uniquely identifies an application object instance in the GUI.

15. The method of claim 14, wherein the set of attributes for the application object in the GUI includes a foreign key or reference to the ID of a related application object, wherein the change to the application object impacts another application object, and wherein using the model synchronizer includes using the a foreign key or reference to identify the impacted application object.

16. The method of claim 15, wherein a definition of the application object type includes an impact relationship attribute, the impact relationship attribute including identification of the change type, the impacted application object type, the name of an attribute of the application object that is a foreign key to the impacted application object, and a set of the impacted application object attributes that require an update when the application object is changed.

17. The method of claim 16, wherein using the model synchronizer includes extracting from the application object type definition of the changed application object, a set of application object types impacted by the change to the application object.

18. The method of claim 16, wherein using the model synchronizer includes, for each application object type in the set:
determining which models in the GUI contain an application object of the type impacted by the change to the application object;
loading from the backend to the GUI the new state values for the impacted application object attributes that are identified in the impact relationship attribute of the changed application object; and
locally copying the new values of the attributes that are loaded from the backend to the impacted application objects in models in the GUI.

19. The method of claim 11, wherein using the eventing mechanism includes decoupling a cause of the change to application object from the model synchronizer's model-updating processes in the GUI.

20. The method of claim 11, wherein using the eventing mechanism and using the model synchronizer includes using processes that are transparent to the models in the GUI.

* * * * *